May 8, 1962 H. B. KAST 3,033,172
PEAK HOLDING SYSTEM
Filed June 23, 1958 2 Sheets-Sheet 2

INVENTOR.
Howard B. Kast
BY
Paul Fitzpatrick
ATTORNEY 3,033,172
PEAK HOLDING SYSTEM
Howard B. Kast, Milwaukee, Wis., assignor to General Motors Corporation, Detroit, Mich., a corporation of Delaware
Filed June 23, 1958, Ser. No. 743,856
10 Claims. (Cl. 121—40)

My invention relates to a peak holding control, by which is meant a control device effective automatically to maintain some measurable effect substantially at its most favorable value. The measurable effect may be the ratio of an effect to a cause, or, in other words, the ratio of a dependent condition to a controllable condition upon which it depends.

The invention is described herein in terms of an illustrative embodiment in a control for a jet propulsion engine which controls the fuel supply to the engine to maintain the most favorable ratio between speed of an aircraft propelled by the engine and the rate of supply of fuel to the engine, or, in other words, maximum specific range. The result is to supply fuel to the engine at such a rate as to obtain maximum flight range from the available fuel. Many other applications of the principles of the invention will be apparent.

The speed of a jet-propelled aircraft is a function of the rate of fuel supply to the engine or engines. In the usual case, for any given installation, total weight of the aircraft, and altitude, the ratio of airspeed to fuel rate increases with fuel rate up to a point, then decreases. This maximum point varies with such factors as aircraft weight and power plant condition. The embodiment of my invention described in detail hereinafter trims the fuel rate to maintain it very close to the maximum point by direct comparison of air speed and fuel rate and control of fuel rate to keep the ratio of air speed to fuel rate substantially at the peak or optimum value.

The principal object of the invention is to provide a control system effective to control a device automatically to obtain the best results from the device.

The nature of the invention and the advantages thereof will be clear to those skilled in the art from the succeeding detailed description of the preferred embodiment of the invention and the accompanying drawings thereof.

Figure 1:
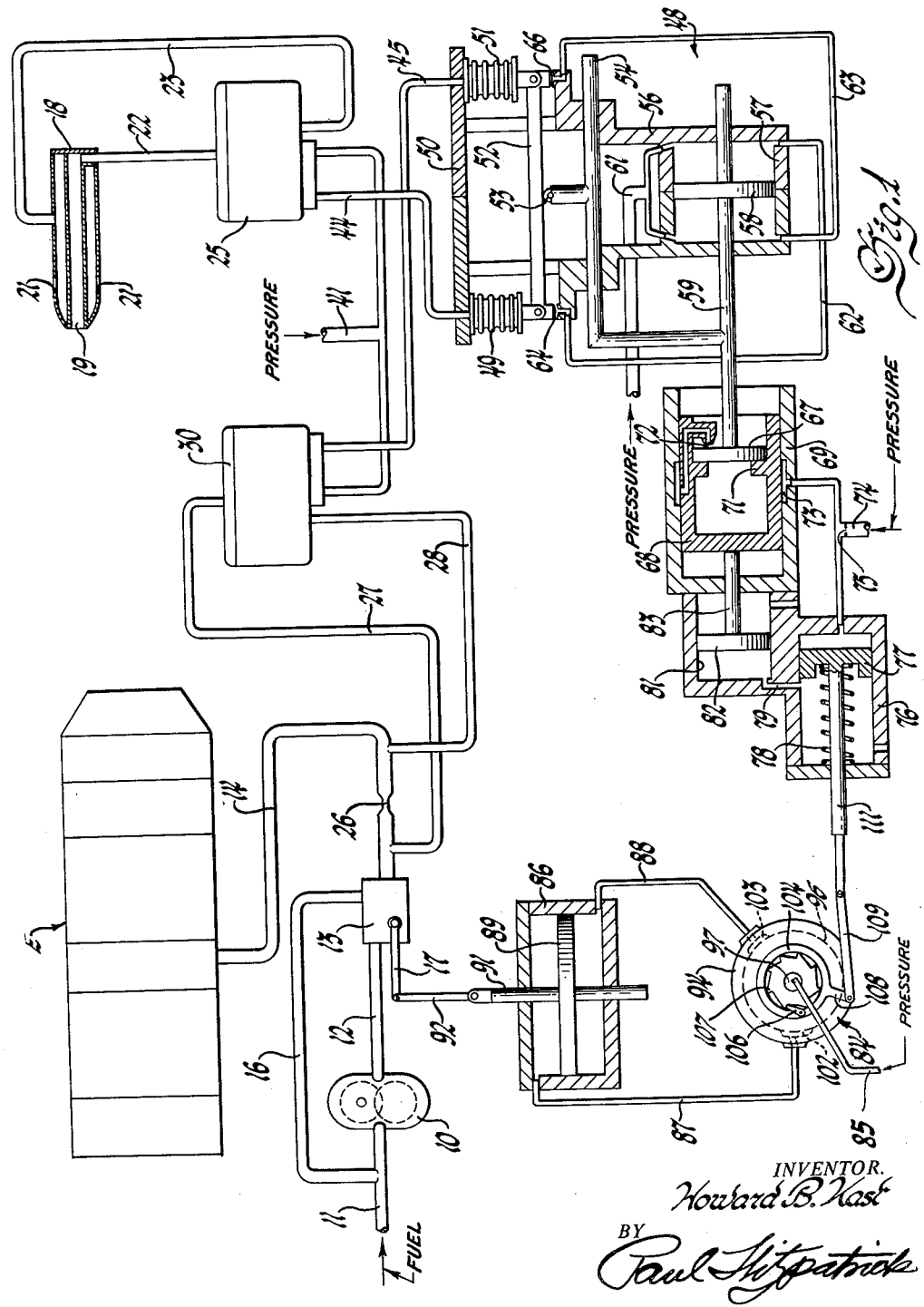
FIGURE 1 is a schematic diagram of a jet engine control.

The control device of FIGURE 1 is associated with a jet engine E, which may be, for example, a conventional turbojet or ramjet engine. The engine may have a conventional fuel system comprising a pump 10 supplied through line 11 and delivering fuel through line 12 to a fuel control device 13 of suitable type. The fuel control delivers fuel at a controlled rate to the engine through a line 14 and returns excess fuel to the pump inlet through a bypass line 16. The rate of fuel supply is determined by an input arm 17 controlling the fuel metering mechanism within the control. The nature of the fuel control device 13 is immaterial to this invention.

Means are provided for measuring and comparing aircraft speed and fuel flow. Speed is measured primarily by a Pitot-static tube 18 having a ram pressure probe 19 and a static pressure probe 21. These probes are connected by pressure lines 22 and 23 to a differential pressure responsive device 25 the function of which is to derive a single control pressure equal (or, if desired, proportional) to the difference between ram pressure and static pressure. This control pressure is a function of aircraft speed.

Fuel flow is measured by a flowmeter which may, for example, be responsive to pressure drop through an orifice or in a venturi. As illustrated, an orifice 26 is disposed in the engine fuel line 14. Pressure lines 27 and 28 connected to line 14 before and behind the orifice receive pressures the difference of which is a function of fuel flow. These pressure lines are connected to a second differential pressure responsive device 30 similar in function to device 25.

It will be noted that the ram pressure rise sensed by probe 18 is proportional to the square of speed and the pressure drop through the orifice 26 is proportional to the square of flow. Thus, these are similar functions of the two quantities, and their quotient is representative of the ratio of the two quantities. Device 25 derives a pressure proportional to ram pressure rise and device 30 derives a pressure proportional to pressure drop through the orifice. The ratio of these derived pressures represents the ratio of airspeed to fuel flow. Actually it is the square of this ratio, but, if it is a maximum, the ratio of airspeed to fuel flow will be a maximum.

Figure 2:
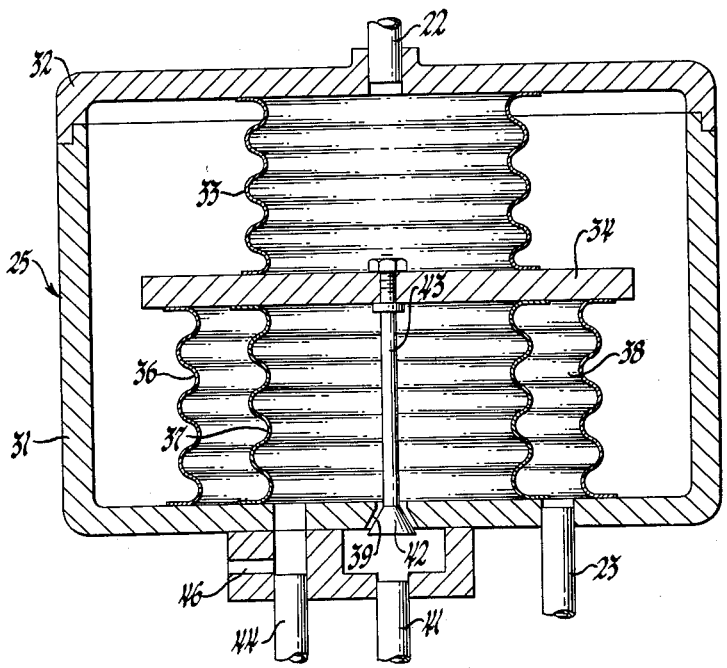
FIGURE 2 is a sectional view of a differenital pressure responsive device.

Before proceeding to describe the ratio determining mechanism, reference may be made to FIGURE 2 showing an exemplary structure of one form of differential pressure responsive device. The device 25, illustrated more or less schematically in FIGURE 2, comprises a case 31 including a fixed cover 32. A bellows 33 mounted between cover 32 and a plate 34 is connected by line 22 to the ram pressure probe 19. Concentric bellows 36 and 37 are mounted between the case 31 and plate 34 in opposition to bellows 33. The cross-sectional area of bellows 37 is equal to that of bellows 33, and that of bellows 36 is twice that of bellows 33. The area of the chamber 38 between the bellows thus also equals that of bellows 33. The area of bellows 37 may be any value, but that of chamber 38 must equal that of bellows 33.

Chamber 38 is connected by pressure line 23 to the static pressure probe 21. The interior of bellows 37 is connected through an orifice 39 to a pressure fluid line 41 supplied with oil or other servo fluid under pressure from a suitable source (not illustrated). The area of orifice 39 is controlled by a conical valve member 42 on a stem 43 fixed to plate 34. Bellows 37 also connects to a control pressure line 44 and a bleed orifice 46. Valve member 42 moves to maintain the pressure in bellows 37 and thus in line 44 equal to the difference of the pressures in lines 22 and 23.

Device 30 may be identical to device 25. It delivers a control pressure through line 45 equal to the difference between the pressures in lines 27 and 28.

The next element of the system is a device for deriving a signal of a magnitude equal to the ratio of the magnitudes of the variables represented by the pressures in lines 44 and 45. This element is a force balance servo device 48. It comprises an airspeed bellows 49 and a fuel rate bellows 51 mounted on a fixed support 50 and connected to the lines 44 and 45, respectively. The free ends of the bellows are connected to a floating beam 52 pivoted on a shiftable fulcrum 53. The fulcrum is mounted on a rod 54 slidably mounted in a housing 56, fixed to support 50, which defines a cylinder 57. A balanced-area piston 58 in the cylinder actuates a rod 59 rigidly coupled to rod 54. Piston 58 is actuated to move fulcrum 53 to the point at which the beam 52 is balanced. Both ends of cylinder 57 are supplied with servo fluid under pressure through a line 61 and restricted inlet ports. The ends of the cylinder are connected through bleed lines 62 and 63 to orifices 64 and 66 controlled by expansion of the bellows 49 and 51.

Assuming, for example, bellows 49 overcomes bellows 51 and reduces orifice 64 to an area less than that of orifice 66, pressure will be greater on the right face of piston 58 than on the left face, and the piston will move to the left until the beam is balanced and orifices 64 and 66 are equal. The position of fulcrum 53 and piston rod 59 thus is a physical magnitude or value representing the ratio of airspeed to fuel rate, and condition which it is desired to maximize.

This provides a basis for operation of the peak holding portion of the system which controls fuel flow by regulating fuel control 13. Piston rod 59 bears a disk 67 slidably mounted in a valve member 68 reciprocable in a valve cylinder 69. Valve member 68 is relatively heavy, and will remain stationary because of friction unless it is forced to move. Disk 67 bears against a flange 71 in the valve member to move it to the left with piston rod 59. As long as the piston rod moves to the left, indicating improving speed to fuel ratio, the valve member is moved with it. In this condition, disk 67 is slightly spaced from a port 72 in the valve member communicating through a channel in the valve member with a groove 73 in the cylinder supplied with pressure servo fluid from line 74, which includes a throttling orifice 75.

Line 74 also is connected to a cylinder 76 within which is mounted a reversing piston 77 biased by a compression spring 78. As long as port 72 is open, spring 78 holds piston 77 to the right. When flange 67 moves to the right, it throttles port 72, increasing the pressure in cylinder 76, and piston 77 makes a stroke to the left. This movement of piston 77 uncovers a port 79 in the wall of cylinder 76 communicating with a cylinder 81 in which a reset piston 82 reciprocates freely. Piston 82 has a rod 83 extending from cylinder 81 into cylinder 69 engageable with valve member 68.

When pressure fluid is admitted to cylinder 81, reset piston 82 pushes against valve member 68 and moves it to the right until flange 71 engages disk 67. This opens outlet 72, relieving the pressure in cylinder 76, and spring 78 returns piston 77. The stroke of piston 77 actuates a reversing valve 84 connected between a line 85 leading from a source of actuating fluid (not shown) and a fuel rate varying actuator cylinder 86. Valve 84 connects one line 87 leading to the cylinder to pressure from the source and the other line 88 to drain or return. Upon each stroke of piston 77, these connections are reversed.

Piston 89 in cylinder 86 is oscillated slowly upward and downward by the hydraulic fluid, reversing direction at each stroke of piston 77. Piston 89 is connected by rod 91 and link 92 to the input or control arm 17 of fuel control 13. Is therefore cyclically increases and decreases the fuel supply to the engine.

It may be desirable to review briefly the operation of the system as so far described. Let us assume, for example, that the fuel supply rate is below that giving the maximum ratio of distance travelled to fuel consumed, referred to as specific range. Therefore, a slight increase in the rate of fuel supply will increase the specific range. We may also assume as an initial condition that valve 84 is in a position which causes piston 89 to move upwardly and thereby adjust fuel control 13 to increase the rate of fuel flow to the engine. For the reasons just stated, the initial increase in fuel flow causes a proportionately greater increase in range. Since specific range is improving, the force balance servo acts to move piston 58 and valve member 68 to the left. When the fuel flow arrives at the value at which specific range is a maximum, this movement will terminate and, as further increase in fuel flow decreases specific range, piston 58 will begin to move to the right. As a result, flange 67 will throttle the port 72, increasing the pressure acting on piston 77 and causing it to move to the left and operate the reversing valve 84 to reverse the servo fluid connections to cylinder 86. Piston 89 therefore reverses and acts upon fuel control 13 to reduce the rate of fuel supply. The specific range again approaches the maximum but this time from the direction of excessive fuel flow. The valve member 68 which has been reset as previously described by piston 82, again moves to the left until the fuel flow has gone beyond the optimum value, whereupon the decrease of specific range again throttles port 72, the reversing valve is actuated, and piston 89 again begins to move upwardly, completing the cycle.

As a result of this hunting movement of the control, the fuel rate is continually oscillated about the peak value, remaining very close to the peak value. As changing conditions alter the optimum fuel rate, the mean point of oscillation of fuel rate will be shifted accordingly.

Figure 4:
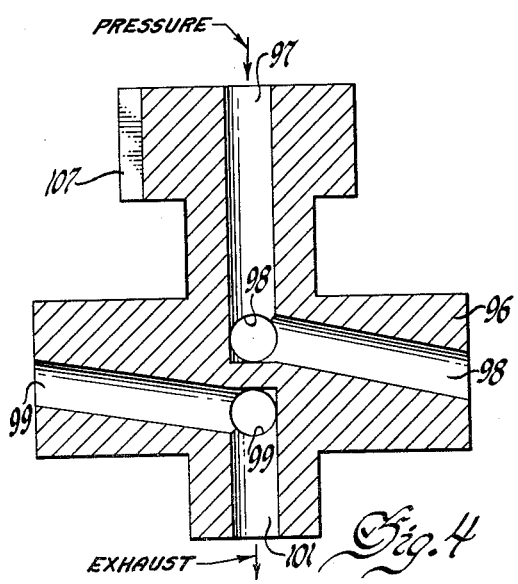
FIGURE 4 is a sectional view of the movable valve member taken on the plane indicated by the line 4—4 in FIGURE 3.
Figure 3:
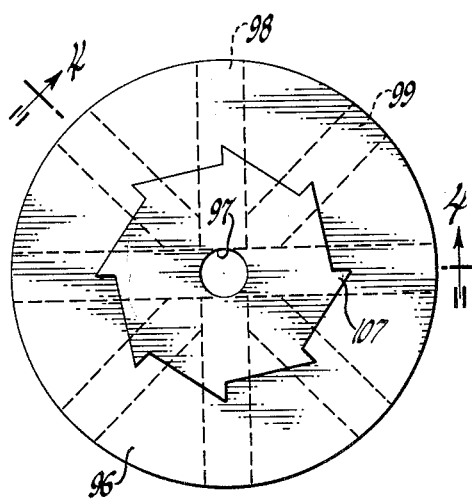
FIGURE 3 is a view of the movable member of a reversing valve.

The reversing valve 84 may be constructed as illustrated in FIGURES 1, 3 and 4. A housing 94 defines an annular chamber within which is mounted valve rotor 96. Pressure fluid is admitted at one end of the rotor shaft through port 97 which connects to four radial passages 98 spaced 90° apart. Fluid exhausts through four intermediate radial passages 99 connecting to an outlet 101 in the other end of the shaft. Ports 102 and 103 in the housing 135° apart connect lines 87 and 88 to the valve rotor.

The valve rotor is turned 45° at each stroke of piston 77 by a ring 104 rotatable about the axis of the valve rotor mounting a pawl 106 cooperating with an eight-tooth ratchet 107 integral with the valve rotor. Ring 104 is coupled by arm 108, link 109, and rod 111 to piston 77.

It will be apparent that the system described may be applied to many control purposes other than that of maximizing specific range described above. It will also be apparent that many modifications and substitutions of components may be made while retaining the mode of operation of the control of the invention.

The control system may respond to any condition and control any other condition to maximize the first condition. The condition responded to may be the ratio of a dependent condition to the controlled condition; it may be the ratio of two dependent conditions; or it may be a single dependent condition.

In the last-mentioned case, the ratio determining mechanism is omitted, and rod 59 is moved by any suitable mechanism (ordinarily including a servo device) responsive to the single condition to be maximized. For example, the control may be applied to maximize ram pressure recovery in a ramjet engine. Intake pressure for such an engine increases, reaches a maximum, and then decreases with increasing fuel flow. A total pressure sensing device in the inlet of a ramjet engine may be connected by an appropriate servomechanism to rod 59, which would vary the fuel flow to the engine as described to maintain maximum total pressure in the intake.

The term "dependent condition" as used in the succeeding claims includes conditions which are the ratios of measurable conditions, which may be dependent upon the controllable condition, and one of which may be the controllable condition.

I claim:

1. A peak holding device comprising, in combination, a first member movable in response to a condition, a second member engageable by the first member in one direction of movement, the second member being movably mounted and being frictionally stable, valve means including cooperating parts on the first and second members, the valve means being actuated by relative movement of the members in the other direction, a fluid-powered actuator motor operated in one direction by actuation of the valve means, resilient means connected to the motor to operate it in the other direction, a fluid-powered reset motor adapted to move the second member in the said other direction of its movement into engagement with the first member, valve means responsive to movement of the actuator motor for energizing the reset motor, hunting means controlling the value of the condition, and means operated by the actuator motor for reversing the hunting means.

2. A peak holding device comprising, in combination, a first member movable in response to a condition, a second member engageable by the first member in one direction of movement, the second member being movably mounted and being frictionally stable, valve means including cooperating parts on the first and second members, the valve means being actuated by relative movement of the members in the other direction, a fluid-powered actuator motor operated in one direction by actuation of the valve means, resilient means connected to the motor to operate it in the other direction, a fluid-powered reset motor adapted to move the second member in the said other direction of its movement into engagement with the first member, and valve means responsive to movement of the actuator motor for energizing the reset motor.

3. A peak holding device comprising, in combination, a first member reciprocable in response to a condition, a second member engageable by the first member in one direction of movement, the second member being reciprocably mounted and being frictionally stable, valve means including cooperating parts on the first and second members, the valve means being closed by relative movement of the members in the other direction, a fluid-powered actuator motor operated in one direction by closing the valve means, resilient means connected to the motor to operate it in the other direction, a fluid-powered reset motor adapted to move the second member in the said other direction of its movement into engagement with the first member, and valve means responsive to movement of the actuator motor for energizing the reset motor.

4. A peak holding device comprising, in combination, means for progressively varying a controllable condition determining the value of a dependent condition, means responsive to the values of the conditions including an output member moved so as to represent the ratio of the conditions, a control member movable in one direction by the output member, means actuated by movement of the output member in the other direction with respect to the control member for reversing the movement of the varying means, and reset means actuated concurrently with the reversing means operative to move the control member in the other direction into engagement with the output member.

5. A peak holding device comprising, in combination, means for progressively varying a controllable condition determining the value of a dependent condition, servo force balance means responsive to the values of the conditions including an output member moved so as to represent the ratio of the conditions, a control member movable in one direction only by the output member, servo means including the output member and the control member for reversing the movement of the varying means, and reset servo means actuated concurrently with the reversing means operative to move the control means into engagement with the output member.

6. A peak holding device comprising, in combination, means for progressively varying a controllable condition determining the value of a dependent condition, servo means responsive to the values of the conditions including an output member moved so as to represent the ratio of the conditions, a control member movable in one direction by engagement with the output member, servo means actuated by movement of the output member in the other direction with respect to the control member for reversing the movement of the varying means, and reset means actuated by the reversing means operative to move the control member in the other direction into engagement with the output member.

7. A peak holding device comprising, in combination, servo means for progressively varying a controllable condition determining the value of a dependent condition, means responsive to the values of the conditions including an output member moved so as to represent the ratio of the conditions, a control valve member movable in one direction by engagement with the output member, servo means actuated by the control valve member in response to movement of the output member in the other direction with respect to the control member for reversing the movement of the varying means, and reset piston means actuated concurrently with the reversing means engageable with the control valve member operative to move the control member in the other direction into engagement with the output member.

8. A control device for maintaining the most favorable ratio of a dependent condition to a controllable condition of which the dependent condition is a function comprising, in combination, means generating a first signal which is a function of the dependent condition, means generating a second signal which is a similar function of the controllable condition, means actuated by the aforementioned means deriving a third signal which represents the ratio of the dependent condition to the controllable condition, means controlling the controllable condition adapted to vary the controllable condition progressively, and servo means actuated by a decrease in the third signal connected to the controlling means to reverse the direction of variation of the controllable condition; the reversing means including a frictionally stable member movable by the third signal deriving means, a valve responsive to relative movement of the frictionally stable member and the third signal deriving means, and a lost motion connection between the said member and valve.

9. A peak holding device comprising, in combination, means for progressively varying a controllable condition determining the value of a dependent condition, means responsive to the value of the dependent condition including an output member moved so as to represent the dependent condition, a control member movable in one direction by the output member, means actuated by movement of the output member in the other direction with respect to the control member for reversing the movement of the varying means, and reset means actuated concurrently with the reversing means operative to move the control member in the other direction into engagement with the output member.

10. A peak holding device comprising, in combination, servo means for progressively varying a controllable condition determining the value of a dependent condition, means responsive to the value of the dependent condition including an output member moved so as to represent the dependent condition, a control valve member movable in one direction by engagement with the output member, servo means actuated by the control valve member in response to movement of the output member in the other direction with respect to the control member for reversing the movement of the varying means, and reset piston means actuated concurrently with the reversing means engageable with the control valve member operative to move the control member in the other direction into engagement with the output member.

References Cited in the file of this patent

UNITED STATES PATENTS

| | | |
|---|---|---|
| 2,687,612 | Anderson et al. | Aug. 31, 1954 |
| 2,761,284 | Malick | Sept. 4, 1956 |
| 2,777,289 | Boucher | Jan. 15, 1957 |
| 2,858,700 | Rose | Nov. 4, 1958 |